(12) United States Patent
Wu et al.

(10) Patent No.: US 11,959,890 B2
(45) Date of Patent: Apr. 16, 2024

(54) EXPERIMENTAL APPARATUS AND EXPERIMENTAL METHOD FOR RESEARCHING CHARACTERISTICS OF SUBSEA TUNNEL AT BOTTOM OF SEABED UNDER WAVE

(71) Applicant: Shandong University, Jinan (CN)

(72) Inventors: Ke Wu, Jinan (CN); Wenbin Xu, Jinan (CN); Dapeng Liu, Jinan (CN); Yajun Liu, Jinan (CN); Zhenhua Liu, Jinan (CN); Zhongyu Dou, Jinan (CN)

(73) Assignee: Shandong University, Jinan (CN)

( * ) Notice: Subject to any disclaimer, the term of this patent is extended or adjusted under 35 U.S.C. 154(b) by 0 days.

(21) Appl. No.: 18/460,357

(22) Filed: Sep. 1, 2023

(65) Prior Publication Data

US 2023/0408392 A1    Dec. 21, 2023

Related U.S. Application Data

(63) Continuation of application No. PCT/CN2021/090213, filed on Apr. 27, 2021.

(30) Foreign Application Priority Data

Apr. 26, 2021   (CN) .......................... 202110452856.2

(51) Int. Cl.
*G01N 3/56*   (2006.01)
*G01M 3/00*   (2006.01)
*G01N 15/08*  (2006.01)

(52) U.S. Cl.
CPC ......... *G01N 3/567* (2013.01); *G01N 15/0826* (2013.01); *G01N 2203/0005* (2013.01);
(Continued)

(58) Field of Classification Search
CPC ........ G01M 7/08; G01M 99/007; G01M 7/02; G01M 9/06; G01M 10/00; G01M 13/00;
(Continued)

(56) References Cited

U.S. PATENT DOCUMENTS 11,136,740 B1 * 10/2021  Du .................... E02D 29/067

FOREIGN PATENT DOCUMENTS

CN         105424466 A       3/2016
CN         106706266 A       5/2017
(Continued)

OTHER PUBLICATIONS

Internation Search Report of PCT/CN2018/080591, dated Jan. 13, 2022.

(Continued)

*Primary Examiner* — Brandi N Hopkins (57) ABSTRACT

The present invention relates to an experimental apparatus for researching characteristics of subsea tunnel at bottom of seabed under wave, comprising main control system, wave making test system, rock and soil confining pressure test system and water level regulation test system, wherein a bottom of the rock and soil confining pressure test system is connected with the water level regulation test system; a bottom of the wave making test system is connected with the rock and soil confining pressure test system; and all test systems are electrically connected with the main control system. The experimental apparatus, when being small, may simulate the situation of the subsea tunnel under a nonlinear complex wave, may consider the common action of the seabed and the wave, and may regulate water levels and soil pressures, having perfect functions and effectively exploring the effect of various aspects on the subsea tunnel.

6 Claims, 5 Drawing Sheets

(52) U.S. Cl.
CPC ............... *G01N 2203/0019* (2013.01); *G01N 2203/0048* (2013.01); *G01N 2203/0676* (2013.01)

(58) Field of Classification Search
CPC ...... G01M 99/002; G01M 99/00; G01V 1/00; G01V 3/12; G01V 1/303; G01V 1/301; E01D 18/00; G01N 33/00; G01N 17/02; G01N 3/00; G01N 3/32; G01N 3/567; G01N 3/303; G01B 11/18; E02D 29/063; Y02A 90/30; G09B 23/40
See application file for complete search history.

(56) References Cited

FOREIGN PATENT DOCUMENTS

| | | |
|---|---|---|
| CN | 107702875 A | 2/2018 |
| CN | 109186937 A | 1/2019 |
| CN | 109556826 A | 4/2019 |
| CN | 111707443 A | 9/2020 |
| JP | 2000249623 A | 9/2000 |

OTHER PUBLICATIONS

Ying, Hongwei et al., "Experiment Research on Response of Excess Pore Pressure To Wave Around Near-Sea Excavation", ock and Soil Mechanics, vol. 37, No. special edition 2, Oct. 31, 2016, ISSN:1000-7598, pp. 188-190, section 2, experimental design.

Zhang Ningchuan et al., "Experimental study on motion response of immersed tube sinking process in submarine tunnel under irregular wave action", Proceedings of the 17th China Marine (Coastal) Engineering Academic Symposium, Nov. 30, 2015.

* cited by examiner

EXPERIMENTAL APPARATUS AND EXPERIMENTAL METHOD FOR RESEARCHING CHARACTERISTICS OF SUBSEA TUNNEL AT BOTTOM OF SEABED UNDER WAVE

CROSS-REFERENCE TO RELATED APPLICATIONS

The present application is a continuation of PCT application PCT/CN2021/090213 entitled "Experimentation Apparatus For Researching Characteristic Of Underwater Tunnel At Bottom Of Seafloor And Subject To Waves, And Experimentation Method" filed on Apr. 27, 2021, which claims priority of Chinese patent application CN202110452856.2, filed on Apr. 26, 2021, the entire contents of which are incorporated herein by reference.

TECHNICAL FIELD

The present invention belongs to the technical field of marine geotechnical engineering experiments, and particular relates to an experimental apparatus and experimental method for researching characteristics of a subsea tunnel at a bottom of a seabed under a wave.

BACKGROUND

At present, with the development of marine resources and transportation, construction of subsea tunnels has become a new hot spot. However, as a subsea tunnel, it not only has the conventional tunnel requirements of carrying an upper load, static impermeability and the like, but also needs to withstand a periodic impact of an upper wave dynamic load at all times, resulting in a change on a bearing capacity of a seabed. Meanwhile, a change on a water pressure will also make the permeability effect of a sea wave on the subsea tunnel change obviously. In order to facilitate a research on the characteristics of the subsea tunnel, a subsea tunnel test apparatus is generally constructed to achieve a simulation research on the characteristics of the subsea tunnel.

In the prior art, the conventional subsea tunnel test apparatus has a large size, high energy consumption, and less simulation of a wave environment, especially fewer researches on the nonlinear complex wave, and less considers the interaction between the seabed and the wave at the same time. For this reason, aiming to the shortcomings of the existing subsea tunnel test apparatus, the present invention proposes an experimental apparatus for researching characteristics of a subsea tunnel at a bottom of a seabed under a wave, and then discusses its operation method in detail.

SUMMARY

In order to solve the above problems in the prior art, the present invention provides an experimental apparatus for researching characteristics of a subsea tunnel at a bottom of a seabed under a wave, which can simulate the influence of a nonlinear complex wave on the subsea tunnel under a small test device, may consider interaction between the wave and the seabed at the same time, and may regulate a water level at the same time.

To achieve the above objective, the present invention adopts the following technical solutions:

An experimental apparatus for researching characteristics of a subsea tunnel at a bottom of a seabed under a wave includes a main control system, a wave making test system, a rock and soil confining pressure test system and a water level regulation test system, wherein a bottom of the rock and soil confining pressure test system is connected with the water level regulation test system; a bottom of the wave making test system is connected with the rock and soil confining pressure test system; and the wave making test system, the rock and soil confining pressure test system and the water level regulation test system are all electrically connected with the main control system.

Preferably, the wave making test system comprises symmetrically arranged glass plates, a first bottom plate and a second bottom plate are arranged on a left side and a right side between the two opposite glass plates, and the wave making test system is isolated from the rock and soil confining pressure test system by virtue of the first bottom plate and the second bottom plate; a telescopic motor spring is arranged at a bottom of the left side between the two glass plates, a top end of the telescopic motor spring is connected with a wave making bottom plate, a top end of the wave making bottom plate is connected with a wave making box, and a wave making upper plate is rotationally connected to a top end of the wave making box by virtue of a rotating shaft; and a first water inlet is formed in a left side of an upper end of each glass plate, and a pressure sensor is vertically embedded into each glass plate.

Preferably, the wave making bottom plate is in an inverted L shape; a vertical baffle plate and a horizontal baffle plate are arranged on right sides of upper ends of the glass plates; the vertical baffle plate and the horizontal baffle plate are arranged on the second bottom plate at an unequal interval; and a wave absorbing slope with toothed bulges are arranged at an end of the second bottom plate.

Preferably, the water level regulation test system includes a water tank arranged at a bottom; the water tank is provided with a second water inlet; a siphon pipe is vertically arranged on a right side of the water tank by virtue of a siphon pipe fixing frame; a water inlet formed in a right end of the siphon pipe is located at a lower part of the water tank; a drainage port formed in a left end of the siphon pipe is located at an upper part of the water tank; a plurality of water outlets are uniformly formed in the left siphon pipe in a height direction, and all provided with electromagnetic valves; and the electromagnetic valves are all electrically connected with the main control system.

Preferably, the rock and soil confining pressure test system includes a test assembly block arranged on the water tank; a test tunnel is formed in a center of the test assembly block; a steel counterforce frame and a small hydraulic press are arranged on a left side and a right side of the test assembly block respectively; and a counterweight block is arranged at a bottom of the small hydraulic press.

Preferably, a water level detector is vertically arranged on the test assembly block, and a plurality of small hydraulic presses are uniformly arranged at a right end of the test assembly block in a height direction.

Preferably, the main control system includes a controller; the wave making test system, the rock and soil confining pressure test system and the water level regulation test system are electrically connected with the controller; the controller may control operations of the wave making test system, the rock and soil confining pressure test system and the water level regulation test system, and may perform self inspection on a device.

The present invention further discloses an experimental method for researching characteristics of a subsea tunnel at a bottom of a seabed under wave, using any one of the above experimental apparatuses, and specifically including the following steps:

(1) placing a test tunnel and a test assembly block first, and then setting a corresponding task for a main control system, analyzing and planning the task by the main control system, self inspecting a device, and confirming that the device is fully prepared;

(2) controlling, by the main control system, start-up of a rock and soil confining pressure test system and a water level regulation system at the same time, beginning to apply a pressure gradually by the small hydraulic press, controlling, by the main control system, electromagnetic valves at water outlets of a plurality of siphon pipes to open at the same time, maintaining a corresponding pressure by the small hydraulic press after the pressure reaches a predetermined confining pressure, and controlling, by the main control system, the electromagnetic valves at the water outlets of the siphon pipes to close after a water level detector detects a water level to reach a predetermined water level; and (3) controlling, by the main control system, opening of a first water inlet of the wave making test system, controlling, by the main control system, closing of the first water inlet of the wave making test system after the water level is sensed to reach a predetermined water level by virtue of a pressure sensor, driving, by the main control system, a wave making box to move up and down by controlling a telescopic motor spring, making a wave making upper plate to rotate around an axis at the same time, simulating a nonlinear complex waveform by virtue of two different wave making modes, detecting a wave quality and condition by virtue of the pressure sensor, making a turbulence phenomenon occur in a case that a wave passes through a vertical baffle plate and a horizontal baffle plate, and reducing the wave in combination with a wave absorbing slope with toothed bulges, so as to make a reflected wave not affect a subsequent test.

Beneficial Effects

The present invention further discloses the experimental apparatus for researching the characteristics of the subsea tunnel at the bottom of the seabed under wave. The experimental apparatus, when being small, may simulate the situation of the subsea tunnel under a nonlinear and complex wave, may further consider the common action of the seabed and the wave, and may regulate different water levels and different soil pressures at the same time, thereby having perfect functions and effectively exploring the effect of various aspects on the subsea tunnel. Next, the experimental apparatus also has the advantages of low energy consumption and environmental protection (for example, use of the siphon pipe, no need for additional external force such as a pump).

Reference numerals in drawings: 100, main control system; 200, wave making test system; 300, rock and soil confining pressure test system; 400, water level regulation test system; 1, first water inlet, 2, pressure sensor, 3, glass plate, 4, first bottom plate, 5, wave making upper plate, 6, wave making box, 7, wave making bottom plate, 8, steel counterforce frame, 9, telescopic motor spring, 10, water level detector, 11, test tunnel, 12, test assembly block, 13, water tank, 14, second water inlet, 15, vertical baffle plate, 16, wave absorbing slope, 17, second bottom plate, 18, small hydraulic press, 19, siphon pipe, 20, siphon pipe water outlet, 21, siphon pipe fixing frame, 22, siphon pipe drainage port, 23, siphon pipe water inlet, 24, counterweight block, and 25, horizontal baffle plate.

DETAILED DESCRIPTION OF THE EMBODIMENTS

The present invention will be described in detail below. Before the description, it should be understood that the terms used in the specification and the accompanying claims should not be construed as limited to general meaning and dictionary meaning, but should be interpreted according to the corresponding meanings and concepts of the technical aspects of the present invention on the basis of the principle of allowing the inventor to properly define the terms for optimal interpretation. Therefore, the description presented here is merely a preferred example for an illustrative purpose, and is not intended to limit the scope of the present invention, and it should be understood that, without departing from the spirit and the scope of the present invention, other equivalents or modifications can be obtained therefrom.

The following embodiments are merely listed as examples of the implementations of the present invention, and do not suggest any limitation as to the present invention. Those skill in the art can understand that all the alterations without departing from the scope of the essence and conception of the present invention fall within the scope of the protection of the present invention. Unless otherwise specified, the reagents and the instruments used in the following embodiments are all commercially available products.

Embodiment 1

As shown in FIGS. 1-4, and 6, an experimental apparatus for researching characteristics of a subsea tunnel at a bottom of a seabed under a wave includes a main control system 100, a wave making test system 200, a rock and soil confining pressure test system 300 and a water level regulation test system 400, where a bottom of the rock and soil confining pressure test system 300 is connected with the water level regulation test system 400; and a bottom of the wave making test system 200 is connected with the rock and soil confining pressure test system 100.

The wave making test system 200 includes a first water inlet 1, a glass plate 3, a pressure sensor 2, a first bottom plate 4, a second bottom plate 17, a wave making upper plate 5, a wave making box 6, a wave making bottom plate 7, a telescopic motor spring 9, a vertical baffle plate 15, a horizontal baffle plate 25, and a wave absorbing slope 16, where the first water inlet 1 is formed in an upper part of the glass plate 3; the pressure sensor 2 is embedded into the glass plate 3; the wave making test system is isolated from the rock and soil confining pressure test system by virtue of the first bottom plate 4 and the second bottom plate 17; the wave making upper plate 5 is mounted at an upper part of the wave making box 6; the wave making box 6 is mounted on the wave making bottom plate 7; the wave making bottom plate 7 is in an L shape, which may ensure sealing of liquid during wave making; the wave making bottom plate 7 is mounted on the telescopic motor spring 9; the vertical baffle plate 15 and the horizontal baffle plate 25 are mounted on the second bottom plate 17 at an unequal interval; and the wave absorbing slope 16 is mounted at an end of the second bottom plate 17.

Figure 1:
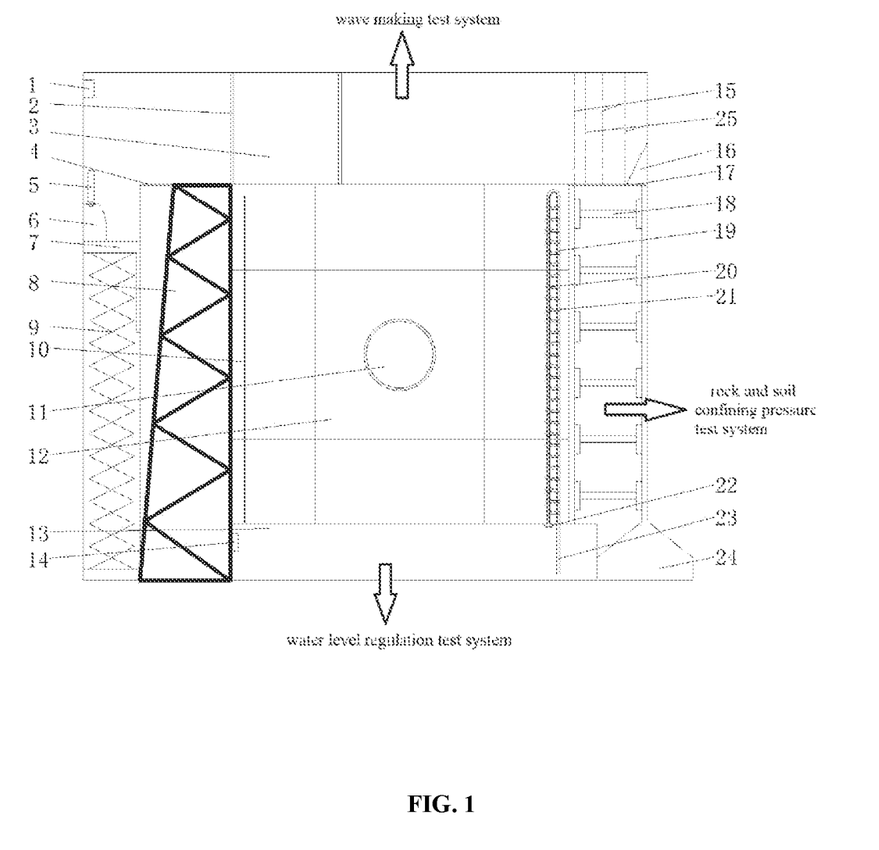
FIG. 1 is a front view of an experimental apparatus for researching characteristics of a subsea tunnel at a bottom of a seabed under a wave according to embodiment 1 of the present invention.
Figure 2:
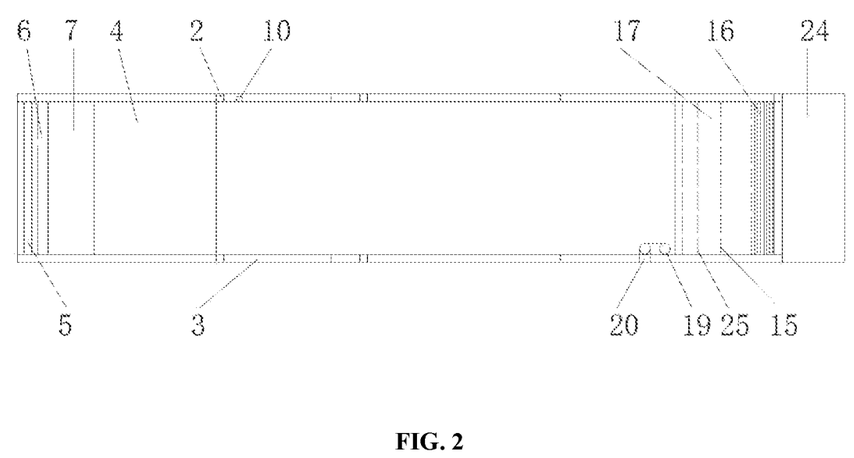
FIG. 2 is a top view of an experimental apparatus for researching characteristics of a subsea tunnel at a bottom of a seabed under a wave according to embodiment 1 of the present invention.
Figure 3:
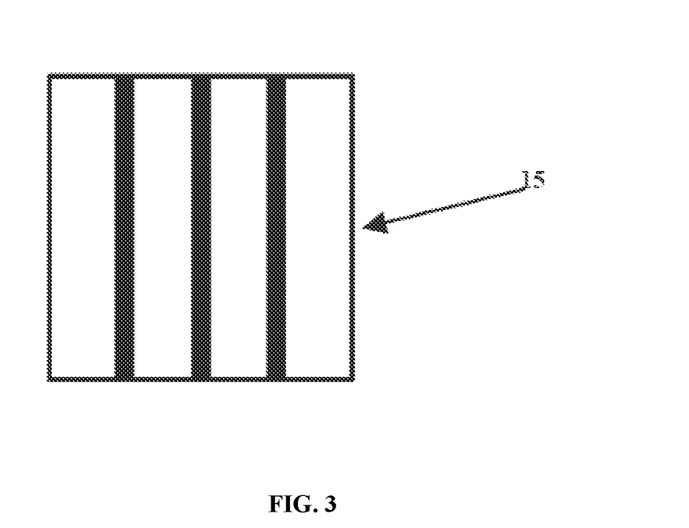
FIG. 3 is a detail front view of a vertical baffle plate according to embodiment 1 of the present invention.
Figure 4:
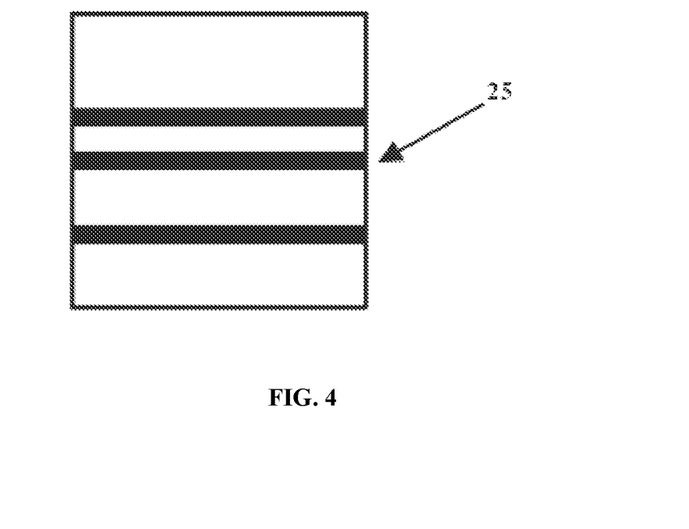
FIG. 4 is a detail front view of a horizontal baffle plate according to embodiment 1 of the present invention.
Figure 6:
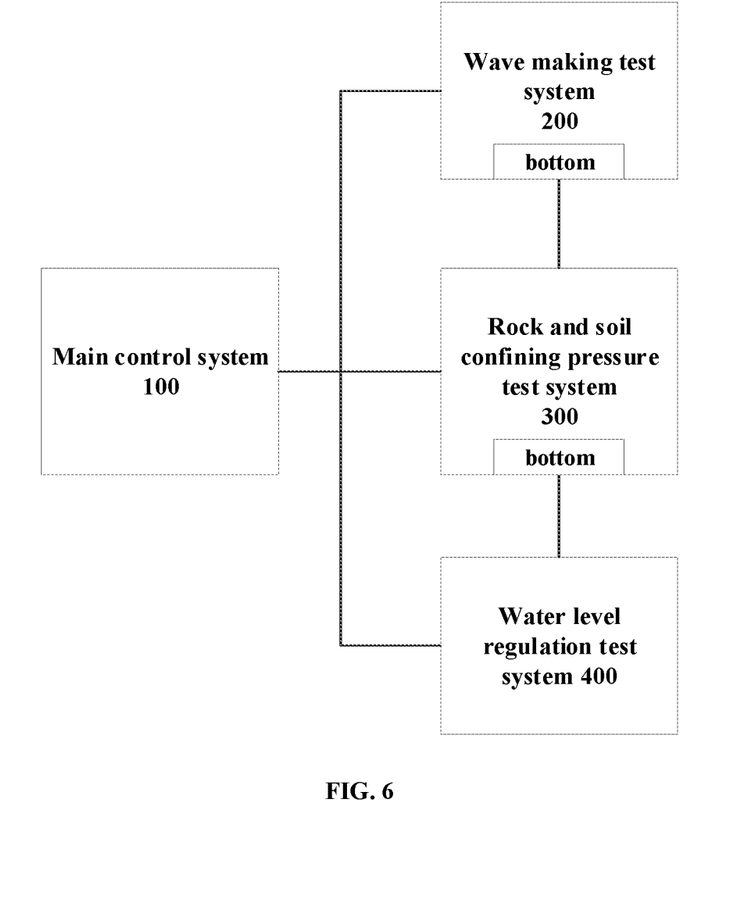
FIG. 6 is a schematic diagram showing the experimental apparatus according to embodiment 1 of the present invention.

The rock and soil confining pressure test system 300 includes a test assembly block 12, a test tunnel 11, a small hydraulic press 18, a steel counterforce frame 8 and a counterweight block 24, where the test assembly block 12 is mounted on the water tank 13; the test tunnel 11 is placed in the center of the test assembly block 12; the small hydraulic press 18 and the steel counterforce frame 8 are distributed on two sides of the test assembly block 12 to be fixed; and the counterweight block 24 is fixed at a lower part of the small hydraulic press 18.

The water level regulation test system 400 includes a water level detector 10, a water tank 13, a second water inlet 14, a siphon pipe 19, a siphon pipe water outlet 20, a siphon pipe fixing frame 21, a siphon pipe drainage port 22 and a siphon pipe water inlet 23, where the water level detector 10 is vertically placed at a corner of the test assembly block 12; the siphon pipe water inlet 23 and the siphon pipe drainage port 22 are mounted at an upper part of the water tank 13; the siphon pipe 19 and the water level detector 10 are diagonally opposite to each other; the siphon pipe 19 is fixed by the siphon pipe fixing frame 21; and the siphon pipe water outlet 20 is distributed on the siphon pipe 19, and is opened and closed along with regulation of the main control system.

Embodiment 2

Figure 5:
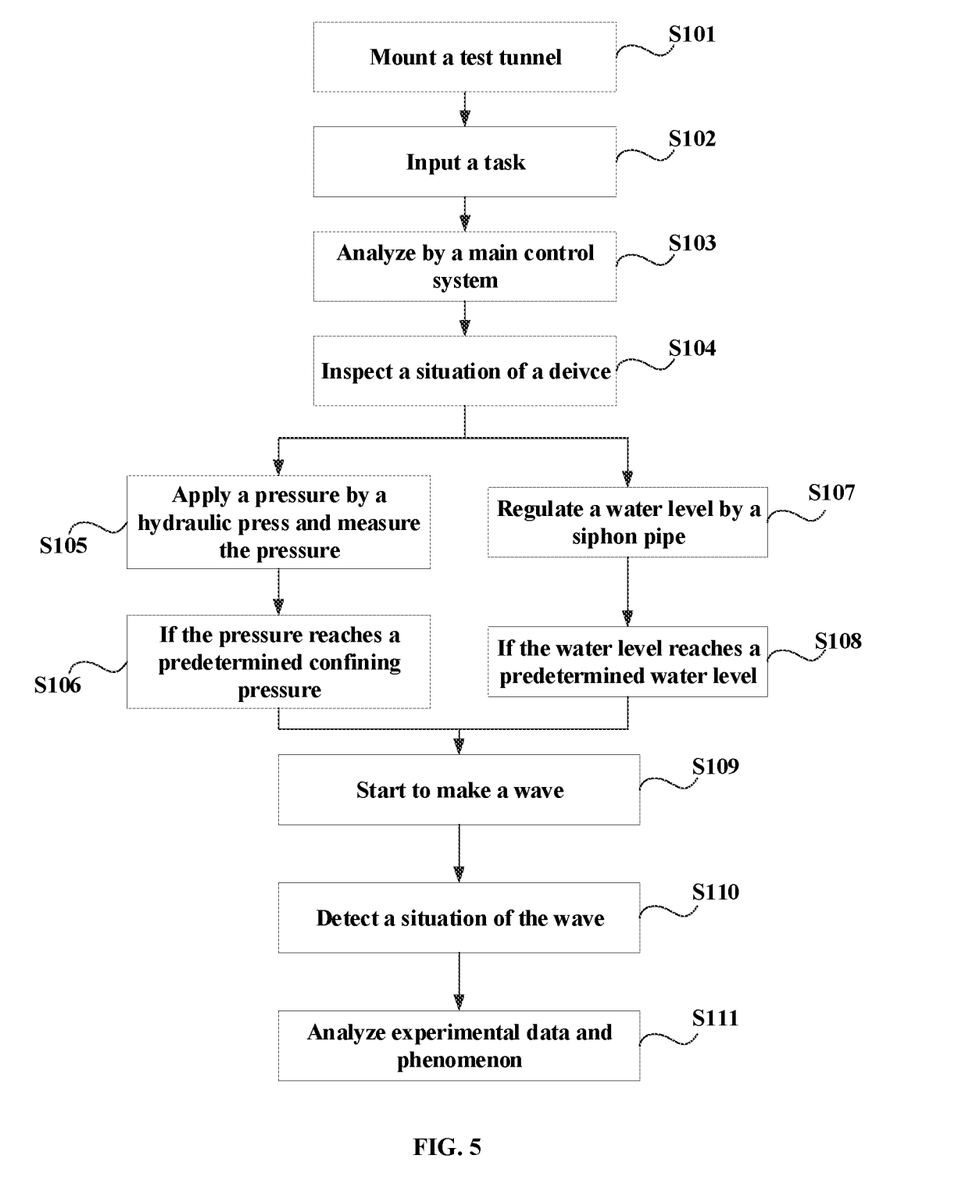
FIG. 5 is a flow chart of an experimental method for researching characteristics of a subsea tunnel at a bottom of a seabed under a wave according to embodiment 2 of the present invention.

An experimental method for researching characteristics of a subsea tunnel at a bottom of a seabed under a wave uses the experimental apparatus according to embodiment 1. Its operation process is shown in FIG. 5, a test tunnel 11 and a test assembly block 12 are placed first, and then a corresponding task is set for a main control system; the main control system analyzes and plans the task, and performs self inspection on a device; after the device is confirmed to make fully preparation, a rock and soil confining pressure test system and a water level regulation system start at the same time; a small hydraulic press 18 begins to apply a pressure gradually; siphon pipe water outlets 20 at corresponding positions are opened (a plurality of siphon pipe water outlets are opened from bottom to top at the same time); the small hydraulic press 18 maintains a corresponding pressure after the pressure reaches a predetermined confining pressure; and the siphon pipe water outlets 20 are closed after a water level detector 10 detects a water level to reach a predetermined water level.

Then, the main control system opens the first water inlet 1, and closes the first water inlet 1 after a pressure sensor 2 senses the water level reaching the predetermined water level. Wave making is started, a wave making box 6 to move up and down by virtue of a telescopic motor spring 9, a wave making upper plate 5 rotates around an axis at the same time, and a nonlinear complex waveform is simulated by virtue of two different wave making modes; a wave quality and condition are detected by virtue of the pressure sensor 2; a turbulence phenomenon may occur in a case that a wave passes through a vertical baffle plate 15 and a horizontal baffle plate 25; and the wave is reduced in combination with a toothed wave absorbing slope 16, so as to make a reflected wave not affect a subsequent test. Meanwhile, another test system may operate under an operation of any test system. For example, under the wave making test system, the rock and soil confining pressure test system is changed to perform relevant test analysis.

The above embodiments are merely used for illustration of the technical solutions of the present invention, but not limit them. Although the present invention has been described in detail with reference to the foregoing embodiments, those of ordinary skills in the art should understand that: the technical solutions described in the foregoing embodiments may still be modified, or equivalent substitutions to some of the technical features may be performed. However, these modifications or substitutions do not make the essence of the corresponding technical solutions deviate from the spirit and scope of the technical solutions of the embodiments of the present invention.

What is claimed is:

1. An experimental apparatus for researching characteristics of a subsea tunnel at a bottom of a seabed under a wave, comprising
a main control system,
a wave making test system,
a rock and soil confining pressure test system and
a water level regulation test system,
wherein a bottom of the rock and soil confining pressure test system is connected with the water level regulation test system;
a bottom of the wave making test system is connected with the rock and soil confining pressure test system;
the wave making test system, the rock and soil confining pressure test system and the water level regulation test system are all electrically connected with the main control system;
wherein the wave making test system comprises symmetrically arranged glass plates, a first bottom plate and a second bottom plate are arranged on a left side and a right side between the two opposite glass plates, and the wave making test system is isolated from the rock and soil confining pressure test system by virtue of the first bottom plate and the second bottom plate;
a telescopic motor spring is arranged at a bottom of the left side between the two glass plates,
a top end of the telescopic motor spring is connected with a wave making bottom plate,
a top end of the wave making bottom plate is connected with a wave making box, and a wave making upper plate is rotationally connected to a top end of the wave making box b virtue of a rotating shaft; and
a first water inlet is formed in a left side of an upper end of each glass plate, and a pressure sensor is vertically embedded into each glass plate.
2. The experimental apparatus for researching the characteristics of the subsea tunnel at the bottom of the seabed under the wave according to claim 1, wherein the wave making bottom plate is in an inverted L shape;

a vertical baffle plate and a horizontal baffle plate are arranged on right sides of upper ends of the glass plates;

the vertical baffle plate and the horizontal baffle plate are arranged on the second bottom plate at an unequal interval; and a wave absorbing slope with toothed bulges are arranged at an end of the second bottom plate.

3. The experimental apparatus for researching the characteristics of the subsea tunnel at the bottom of the seabed under the wave according to claim 1, wherein the water level regulation test system comprises a water tank arranged at a bottom;

the water tank is provided with a second water inlet;

a siphon pipe is vertically arranged on a right side of the water tank by virtue of a siphon pipe fixing frame;

a water inlet formed in a right end of the siphon pipe is located at a lower part of the water tank;

a drainage port formed in a left end of the siphon pipe is located at an upper part of the water tank;

a plurality of water outlets are uniformly formed in the left siphon pipe in a height direction, and all provided with electromagnetic valves; and the electromagnetic valves are all electrically connected with the main control system.

4. The experimental apparatus for researching the characteristics of the subsea tunnel at the bottom of the seabed under the wave according to claim 3, wherein the rock and soil confining pressure test system comprises a test assembly block arranged on the water tank;

a test tunnel is formed in a center of the test assembly block;

a steel counterforce frame and a small hydraulic press are arranged on a left side and a right side of the test assembly block respectively; and a counterweight block is arranged at a bottom of the small hydraulic press.

5. The experimental apparatus for researching the characteristics of the subsea tunnel at the bottom of the seabed under the wave according to claim 4, wherein a water level detector is vertically arranged on the test assembly block, and a plurality of small hydraulic presses are uniformly arranged at a right end of the test assembly block in a height direction.

6. The experimental apparatus for researching the characteristics of the subsea tunnel at the bottom of the seabed under the wave according to claim 1, wherein the main control system comprises a controller;

the wave making test system, the rock and soil confining pressure test system and the water level regulation test system are electrically connected with the controller;

the controller may control operations of the wave making test system, the rock and soil confining pressure test system and the water level regulation test system, and may perform self inspection on a device.

\* \* \* \* \*